United States Patent Office 2,933,528
Patented Apr. 19, 1960

2,933,528

POLYAMIDES OF 4,4-BIS(4-HYDROXYPHENYL) PENTANOIC ACID

Sylvan O. Greenlee, Racine, Wis., assignor to S. C. Johnson & Son, Inc., Racine, Wis.

No Drawing. Application September 5, 1956
Serial No. 608,171

5 Claims. (Cl. 260—559)

This invention relates to a new class of polyhydric phenols having a predetermined hydroxyl content and molecular weight. More particularly, this invention relates to a new class of polyhydric phenols prepared from a polyamine and an aryl-substituted acid.

In the formulation of plasticized resin compositions, one of the greatest problems encountered is the manner of plasticizing and imparting air-drying or heat conversion characteristics while retaining other desired properties. According to conventional practice, the resin is compounded with one or more materials which contribute the plasticizing and/or drying characteristics. Since the resin and plasticizer or drying oil must be completely miscible with one another, certain other properties of the resin are sacrificed. For example, a formulator will choose a very soluble resin because of its miscibility even though the product is inferior with respect to toughness, chemical resistance or flexibility.

Long-chain unsaturated acids containing at least about 10 carbon atoms constitute suitable plasticizers. These materials also are desirable because of the conversion characteristics which are imparted due to their unsaturation. The present invention embraces the production of polyhydric phenols having a predetermined hydroxyl content and molecular weight, and ancillary thereto, having variable softening points and solubility characteristics. By esterifying the hydroxyl groups of the phenols with converting or plasticizing unsaturated acids, products having a wide variety of properties may be obtained. Products of this type dissolved in an organic solvent form coating compositions which, on air-drying, polymerize through the unsaturated groups to form flexible, tack-free films. It will be appreciated from the foregoing that the subject polyhydric phenols constitute compositions unique in the art, comprising resinous materials capable of being tailored to suit a particular need. In addition, the subject phenols are adapted to have desired functional groups, such as plasticizing groups, chemically coupled thereto so that there can be no separation thereof during or after processing, and whereby the characteristics contributed by all components will be found undiminished in the final product.

Compounds capable of accomplishing the above ends are the polyhydric phenols prepared by contacting a polyamine with an aryloxy-substituted pentanoic acid to form the corresponding polyamide. Such compositions may be prepared, for example, by reacting 1 mol of diethylene triamine with 3 mols of 4,4-bis(4-hydroxyphenyl)pentanoic acid, wherein complete amidification yields a hexahydric phenol.

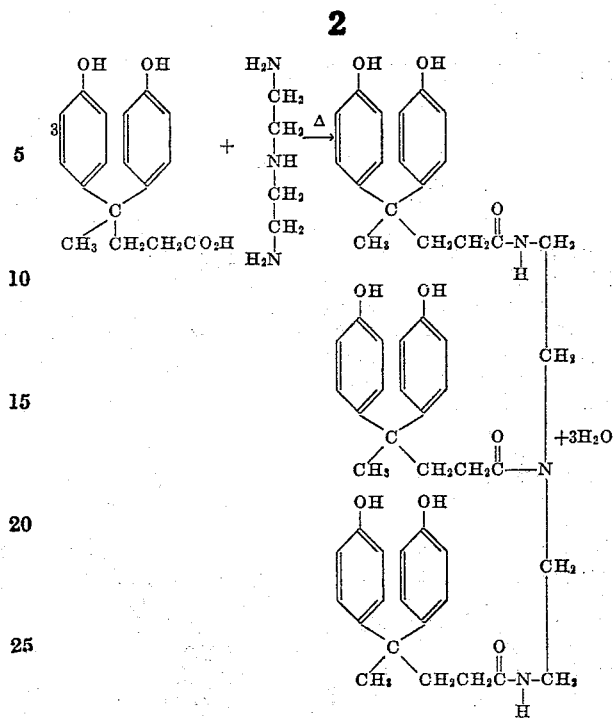

The aryloxy-substituted acid contemplated for use herein should have two hydroxyaryl groups attached to a single carbon atom. The preparation of such an aryloxy acid is most conveniently carried out by condensing a keto-acid with the desired phenol. Experience in the preparation of bisphenol and related compounds indicates that the carbonyl group of the keto-acid should be positioned next to a terminal methyl group in order to obtain satisfactory yields. Prior applications, Serial Nos. 464,607 and 489,300 filed October 25, 1954 and February 18, 1955, respectively, disclose a number of illustrative compounds suitable for use as the aryloxy-substituted acid, and methods of preparing the same. These materials, which are referred to for convenience as Diphenolic Acid or DPA, consist of the condensation products of levulinic acid and phenol, substituted phenols, or mixtures thereof. It is to be understood that the phenolic nuclei of the Diphenolic Acid may be substituted with any groups which will not interfere with the reactions contemplated. For example, the nuclei may be alkylated as disclosed in Serial No. 489,300 or they may be halogenated. The Diphenolic Acid derived from substituted phenols, such as the alkylated phenols, are sometimes more desirable than the products obtained from the unsubstituted phenols since the alkyl groups impart better organic solvent solubility, flexibility and water resistance. However, the unsubstituted product is usually more readily purified.

A large number of polyamines are suitable for use in preparing the subject polyhydric phenols. They may be aliphatic, aromatic, substituted with other functional groups, or unsubstituted. It is necessary that the amines used contain at least two primary or secondary amine groups. The substituted materials contemplated are those which do not contain functional groups which would tend to interfere with the reactions of the Diphenolic Acid through its carboxyl group. For example, polyamines containing a carboxyl group, such as diamino benzoic acid, would be unsuited since the amidification of the Diphenolic Acid would be competing with the amidification of the benzoic acid carboxyl group. Amino ethers or hydroxyamines are examples of suitable substituted compounds. The aliphatic polyamines may be either low molecular weight or high molecular weight compounds. Illustrative low molecular weight polyamines are ethylenediamine, trimethylenediamine, propylenediamine 1,2, tetramethylenediamine, hexamethylenediamine, diethylenetriamine, and triethylenetetramine. These amines are conveniently prepared by the reaction of ammonia with the alkyl halides or by reacting glycols with ammonia in the presence of a contact catalyst. The primary, secondary, and tertiary amines being conveniently separated by boiling point differences or by extraction. These low molecular weight aliphatic polyamines are usually obtained commercially as aqueous solutions and are conveniently used in this reaction as such, thus eliminating the necessity of stripping off water before use. The high molecular weight polyamines are usually prepared from polymerized fatty acids such as capric, undecanoic, lauric, myristic, palmitic, stearic, oleic, linoleic, linolenic, etc. This can be accomplished by the reaction of ammonia with the polymerized fatty acid through a liquid- or vapor-phase process to form the nitrile, such nitriles are then hydrogenated to form the amine. This process usually results in a mixture of primary and secondary amines which are rather difficult to separate; therefore, the preferred method is the reaction of the acid with ammonia to form the amide and subsequent degradation to the amine by the Hoffman reaction. Usually high yields of the primary amine are realized. The most important of the high molecular weight polyamines are probably those derived from the dimer acids of long-chain fatty acids such as soya bean and linseed oil fatty acids but polyamines from the higher molecular weight glycols are also a practical source.

Operable aromatic polyamines are the mononuclear, non-fused polynuclear and fused polynuclear polyamines. Many of the first two types may be described as phenylenepolyamines, wherein two of the aromatic hydrogens are replaced by amino groups or organic radicals containing the same. Illustrative compounds are p-phenylene diamine, aminobenzyl phenyleneamine, tri(p-aminophenyl)methane, and diamino diphenylamine. Other non-fused compounds include those having more than two of the aromatic hydrogens replaced by amino groups or other radicals, e.g. toluene-2,4-diamine, 3,3'-bitolylene-4,4'-diamine. The characteristics of the final polyhydric phenols of this invention can be varied to a large extent by the selection of the polyamine to be used. For example, if a long-chain polyamine is used, the resultant product would probably be more flexible than if a short-chain or aromatic polyamine was used. The number of amino groups present should be limited to about four, since more than this number would probably result in highly cross-linked tridimensional products, thereby giving poor solvent solubility.

Amidification of the polyamines with Diphenolic Acid is conveniently carried out by direct heating at temperatures of from 175-275° C. under conditions such that water produced during condensation is continuously removed as it is formed. Since the Diphenolic Acid has boiling points higher than the amidification temperature range used, and since the amines are polyfunctional and form salts immediately on contact with the Diphenolic Acid, no difficulty is encountered in carrying out the reaction in the temperature range of 175-275° C. even with the lower boiling amines, such as ethylene diamine. By this process, the polyamine is slowly added with agitation to molten Diphenolic Acid. Alternatively it may be convenient to carry out the reaction in the presence of water, initially forming an amine salt. The aqueous slurry is gradually heated to reflux and water removed until the above optimum reaction temperature is reached. The water formed during amidification may be removed by merely permitting it to volatilize, or removal may be facilitated by continuously bubbling through the reaction mixture during amidification a stream of inert gas, such as carbon dioxide or nitrogen. It is also sometimes convenient to facilitate the water removal by carrying out the reaction in a vessel provided with condenser attached thereto through a water trap, adding a sufficient amount of a volatile, water-insoluble solvent to give reflux at the amidification temperature, continually removing the water by azeotropic distillation, permitting the solvent to return to the reaction mixture after having dropped the water in the water trap.

A brief study of the prior art will show the present compositions to be unique. Heretofore, very few polyhydric phenols have been available wherein each hydroxyl group is attached to a different nucleus. Examples of such materials are bisphenol [bis(4-hydroxyphenyl)isopropylidene] and the phenol-aldehyde condensation products. According to the teachings of the present invention, the preparation of a great variety of polyhydric phenols is possible merely by varying the polyamine employed for amidification.

Examples I through VIII illustrate one method of preparing the polyamides of this invention. In this method, the reaction mixture was diluted with water to dissolve the complex amine salt formed as an intermediate. Without the water, more extreme or lengthy heating is required to melt the salt and continue the reaction. Proportions expressed refer to parts by weight unless otherwise indicated. Softening points as used herein were run by the Durrans' Mercury Method (Journal of Oil and Color Chemists' Association, 12, 173–175 [1929]). Acid values as used herein are defined as the number of milligrams of potassium hydroxide equivalent to the free acid contained in a one-gram sample. Amine values as used herein are defined as the number of milligrams of potassium hydroxide equivalent to the free amine contained in a one-gram sample. These values were determined by electrometric titrations.

*Example I*

In a 2-liter 3-necked flask equipped with thermometer, stirrer, and reflux condenser was placed 572 parts DPA, 63 parts ethylenediamine as a 95% aqueous solution, and 300 parts of water. The reaction mixture was refluxed for 55 minutes after which, upon incorporation of a suitable trap between the condenser and flask, water was distilled from the reaction mixture during a 4-hour period. The flask temperature rose to 238° C., 330 parts of water were isolated, and when no more distillate could be obtained, the resultant product, 571 parts of the diamide of 4,4-bis(4-hydroxyphenyl)pentanoic acid and ethylene diamine was isolated. It had an amine value of 1.8, an acid value of 14, and a softening point of 110° C.

*Example II*

In a 2-liter 3-necked flask equipped with thermometer, stirrer and reflux condenser was placed 572 parts DPA, 87 parts propylenediamine-1,2 as an 85% aqueous solution, and 300 parts of water. The reaction mixture was refluxed for 1 hour and 25 minutes after which, upon incorporation of a suitable trap between the condenser and flask, water was distilled from the reaction mixture during a 5-hour period. The flask temperature rose to 219° C., 330 parts of water were isolated, and when no more distillate could be obtained, the resultant product, 502 parts of the diamide of 4,4-bis(4-hydroxyphenyl)-pentanoic acid and propylenediamine-1,2 was isolated. It had an amine value of 42, and acid value of 0, and a softening point of 115° C.

Example III

In a 2-liter 3-necked flask equipped with thermometer, stirrer and reflux condenser was placed 406 parts DPA, 74 parts diethylenetriamine and 200 parts of water. The reaction mixture was refluxed for 35 minutes after which upon incorporation of a suitable trap between the condenser and flask water was distilled from the reaction mixture during a 7-hour period. The flask temperature rose to 215° C., 236 parts of water were isolated, and when no more distillate could be obtained, the resultant product, 399 parts of the diamine of 4,4-bis(4-hydroxyphenyl)pentanoic acid and diethylenetriamine were isolated. It had an amine value of 71, an acid value of 31, and a softening point of 128° C.

Example IV

In a 2-liter 3-necked flask equipped with thermometer, stirrer and reflux condenser was placed 286 parts DPA, 73 parts triethylenetetramine, and 200 parts of water. The reaction mixture was refluxed for 1 hour after which upon incorporation of a suitable trap between the condenser and flask water was distilled from the reaction mixture during a 7-hour period. The flask temperature rose to 202° C., 213 parts of water were isolated, and when no more distillate could be obtained, the resultant product, 364 parts of the diamide of 4,4-bis(4-hydroxyphenyl)pentanoic acid and triethylenetetramine was isolated. It had an amine value of 96, an acid value of 0, and a softening point of 117° C.

Example V

In a 2-liter 3-necked flask equipped with thermometer, stirrer, and reflux condenser was placed 286 parts DPA and 80 parts hexamethylene diamine as a 70% aqueous solution. Upon incorporation of a suitable trap between the condenser and the flask water was distilled from the reaction mixture during a period of 16 minutes. The flask temperature rose to 252° C., 36 parts of water were isolated, and when no more distillate could be obtained, the resultant product, 326 parts of the diamide of 4,4-bis(4-hydroxyphenyl)pentanoic acid and hexamethylene diamine was isolated. It had an amine value of 10.5, an acid value of 0, and a softening point of 83° C.

Example VI

In a 2-liter 3-necked flask equipped with thermometer, stirrer, and reflux condenser was placed 572 parts DPA, 108 parts p-phenylenediamine, and 300 parts of water. The reaction mixture was refluxed for 1 hour and 15 minutes after which upon incorporation of a suitable trap between the condenser and flask water was distilled from the reaction mixture during a 4-hour period. The flask temperature rose to 240° C., 336 parts of water were isolated, and when no more distillate could be obtained, the resultant product, 610 parts of the diamide of 4,4-bis(4-hydroxyphenyl)pentanoic acid and p-phenylenediamine was isolated. It had an amine value of 7.2, an acid value of 19.4, and a softening point of 91° C.

Example VII

In a 2-liter 3-necked flask equipped with a thermometer, stirrer and reflux condenser was placed 286 parts DPA, 99 parts p,p'-methylene dianiline, and 200 parts of water. Upon incorporation of a suitable trap between the condenser and flask water was distilled from the reaction mixture during a 6-hour period. The flask temperature rose to 220° C., 214 parts of water were isolated, and when no more distillate could be obtained, the resultant product, 359 parts of the diamide of 4,4-bis(4-hydroxyphenyl)pentanoic acid and methylene dianiline were isolated. It had an amine value of 2.3, an acid value of 19.1, and a softening point of 164° C.

Examples VII through XIX illustrate the alternate method of preparing the subject polyamides. It should be noted that no water is used other than the water present in commercially available polyamines, and that virtually any temperature within the preferred range can be employed. In some of the examples the two materials were reacted in bulk, while in others, the polyamine was added dropwise to the DPA.

Example VIII 572 parts DPA were charged to a 1-liter 4-necked fluted flask equipped with thermometer, stirrer, reflux condenser, and dropping funnel. Heat was applied using an electric heating mantle. 70 parts ethylenediamine, as an 86% aqueous solution, were charged to the dropping funnel. When the DPA was melted, a dropwise addition of ethylenediamine was begun with continuous stirring of reactants. Sufficient heat was maintained to keep the DPA molten. After all the ethylenediamine was added, approximately 30 minutes, a water trap was inserted in the system and the temperature raised to 230° C. Water was being removed during this time. The temperature was held at 230° C. for 5 hours and 40 minutes. The final product had an acid value of 10.7, an amine value of 24.9, and a softening point of 124° C.

Example IX

The reaction was carried out as in Example VIII with heating time reduced to 1 hour and 45 minutes at 230° C. The final product had an acid value of 15, an amine value of 21, and a softening point of 142° C.

Example X 572 parts DPA were charged to a 1-liter 4-necked fluted flask equipped with thermometer, stirrer, reflux condenser, and dropping funnel. Heat was applied using an electric heating mantle. 103 parts of diethylenetriamine were charged to a dropping funnel. When the DPA was melted, dropwise addition of diethylenetriamine was begun with continuous stirring of reactants. Sufficient heat was maintained to keep the DPA molten. After all of the diethylenetriamine had been added, addition time being approximately 45 minutes, a water trap was inserted in the reaction system and the temperature raised to 230° C. Water was being removed during this time. The temperature was held at 230° C. for 4 hours and 15 minutes. The final acid value of the reaction product was 0, the amine value 82.6, and the softening point 108° C.

Example XI 286 parts DPA were charged to a 1-liter 4-necked fluted flask equipped with thermometer, stirrer, reflux condenser, and dropping funnel. Heat was applied using an electric heating mantle. 87 parts propylenediamine-1,2 as an 85% aqueous solution were charged to a dropping funnel. When the DPA was melted, dropwise addition of propylenediamine-1,2 was begun with continuous stirring. Sufficient heat was maintained during the addition to keep the DPA molten. After the final propylenediamine-1,2 was added, approximately 45 minutes, a water trap was inserted in the system and temperature raised to 227° C. Water was being removed during this time. The temperature was held at 227° C. for 5 hours and 45 minutes. The final reaction product had an acid value of 0, an amine value of 92.6, and a softening point of 98° C.

Example XII

In a 2-liter 3-necked flask equipped with thermometer, stirrer, and reflux condenser was placed 572 parts DPA and 87 parts propylenediamine-1,2 as an 85% aqueous solution. A suitable water trap was inserted between the condenser and flask and water was distilled from the reaction mixture while raising the temperature to 242° C. The temperature was held at 242° C. for 4 hours. The resultant product had an acid value of 0, an amine value of 10.63, and a softening point of 112° C.

Example XIII

The reaction was carried out as in Example XII with the reaction time being reduced to 2 hours at 275° C. The resultant product had an acid value of 0, an amine value of 30.7, and a softening point of 149° C.

Example XIV

The reaction was carried out as in Example XII with the reaction temperature being reduced to 175° C. for 14 hours and 30 minutes. After 8 hours at 175° C. the reaction product had an acid value of 17.3, an amine value of 27.3, and a softening point of 129° C. The final reaction product had an acid value of 21.2 and an amine value of 16.04.

Example XV 572 parts DPA were charged to a 1-liter 4-necked fluted flask equipped with thermometer, stirrer, reflux condenser, and dropping funnel. Heat was applied with an electric heating mantle. 146 parts triethylenetetramine were charged to the dropping funnel. When the DPA was melted, dropwise addition of ethylenediamine was begun with continuous stirring. Sufficient heat was maintained to keep the DPA molten. After all the triethylenetetramine had been added, approximately 1 hour, a water trap was inserted in the system and temperature raised to 230° C. Water was being removed during this time. The temperature was held at 230° C. for 6 hours. The final reaction product had an acid value of 0, an amine value of 84.9, and a softening point of 116° C.

Example XVI

In a 2-liter 3-necked flask equipped with thermometer, stirrer, and reflux condenser was placed 572 parts DPA and 146 parts triethylenetetramine. A water trap was inserted between the reaction flask and the reflux condenser. The temperature was raised to 290° C. while water was being taken off and held at this temperature for 11 hours and 30 minutes at which time water had stopped distilling over. The final reaction product had an acid value of 0, an amine value of 75.4, and a softening point of 156° C.

Example XVII

In a 2-liter 3-necked flask equipped with thermometer, stirrer, and reflux condenser was placed 572 parts DPA and 108 parts phenylenediamine. Heat was applied using an electric heating mantle. A suitable water trap was inserted between the reaction flask and reflux condenser and temperature raised to 260° C. Temperature was held at 260° C. for 6 hours and 30 minutes with continuous removal of water. The final reaction product had an acid value of 0, an amine value of 4.47, and a softening point of 168° C.

Example XVIII

The utility of the subject polyhydric phenols may be illustrated by the preparation of a typical ester of the same. A mixture of 89 parts of the polyhydric phenol from Example I and 143 parts of linseed oil acids was esterified to yield a product having an acid value of 7. The ester was prepared by heating the phenol with an acid at temperatures of 190–260° C. in the presence of acetic anhydride, the amount of the latter being 10% in excess of the molar portion of acid used. The final product had a viscosity of E (Gardner Bubble Viscosimeter) when dissolved in heavy naphtha (boiling range 145–225° C., aniline point 60° C.) to a 40% nonvolatile content. This product treated with .03% cobalt drier (based on nonvolatile content) and spread on glass panels with .002" film thickness applicator resulted in a tack-free film on air-drying. Hard, flexible films are also obtained by baking for 30 minutes at 150° C. The baked film was unaffected after 3 hours and 15 minutes in boiling water and also after 3 hours in 5% aqueous sodium hydroxide at room temperature.

It is to be understood that the above examples are intended to be illustrative only. They should not be construed as limiting the scope of the present invention since embodiments other than those specifically disclosed may be produced without departing from inventive concept taught.

This case is a continuation-in-part of Serial No. 505,552, filed May 2, 1955, now abandoned.

It is claimed and desired to secure by Letters Patent:

1. As a composition of matter a member of the group consisting of an N-acylated amine selected from the group consisting of alkylene amines, monocyclic aryl amines and non-fused polycyclic aryl amines having only from 2 to 4 amino groups as the sole amide forming groups and in which said amino groups contain only hydrocarbon substituents, and an acid having the formula:

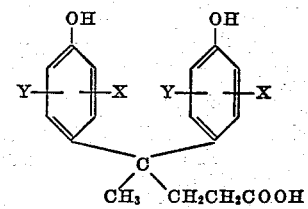

wherein X and Y are members of the group consisting of hydrogen and lower alkyl, said N-acylated amine having only one hydrogen atom of at least 2 of said amino groups replaced by the acyl group of said acid.

2. The composition of claim 1 wherein the amine is ethylene diamine and the acid is 4,4 bis(4-hydroxyphenyl) pantanoic acid.

3. The composition of claim 1 wherein the amine is propylene diamine and the acid is 4,4 bis(4-hydroxyphenyl) pentanoic acid.

4. The composition of claim 1 wherein the amine is hexamethylene diamine and the acid is 4,4 bis(4-hydroxyphenyl) pentanoic acid.

5. The composition of claim 1 wherein the amine is phenylene diamine and the acid is 4,4 bis(4-hydroxyphenyl) pentanoic acid.

No references cited.

UNITED STATES PATENT OFFICE

CERTIFICATE OF CORRECTION

Patent No. 2,933,528                        April 19, 1960

Sylvan O. Greenlee

It is hereby certified that error appears in the printed specification of the above numbered patent requiring correction and that the said Letters Patent should read as corrected below.

Column 5, line 73, for the numeral "VII" read -- VIII --; column 8, line 50, for "pantanoic" read -- pentanoic --.

Signed and sealed this 25th day of October 1960.

(SEAL)
Attest:

KARL H. AXLINE
Attesting Officer

ROBERT C. WATSON
Commissioner of Patents